COURTLAND H. BARR, SR.
COURTLAND H. BARR, JR.
JOHN W. BARR
JAMES W. LUCAS
INVENTORS.

BY Lyon & Lyon
ATTORNEYS.

COURTLAND H. BARR, SR.
COURTLAND H. BARR, JR.
JOHN W. BARR
JAMES W. LUCAS
INVENTORS.

BY Lyon & Lyon
ATTORNEYS.

COURTLAND H. BARR, SR.
COURTLAND H. BARR, JR.
JOHN W. BARR
JAMES W. LUCAS
INVENTORS.

BY Lyon & Lyon
ATTORNEYS.

COURTLAND H. BARR SR.
COURTLAND H. BARR JR.
JOHN N. BARR
JAMES W. LUCAS
INVENTORS.

BY Lyon & Lyon
ATTORNEYS

United States Patent Office 3,326,206

Patented June 20, 1967

3,326,206

BLOOD SAMPLING DEVICE WITH RELEASABLE CANNULA RETAINING MEANS

Courtland H. Barr, Sr., Los Angeles, Courtland H. Barr, Jr., La Canada, John W. Barr, Glendale, and James W. Lucas, Los Angeles, Calif., assignors to Courtland Laboratories, Los Angeles, Calif., a corporation of California Filed May 31, 1966, Ser. No. 560,040
13 Claims. (Cl. 128—2)

This application is a continuation-in-part of application Ser. No. 240,553 filed Nov. 28, 1962, now abandoned, and which is expressly incorporated herein by reference.

This invention relates to apparatus for the collection of blood samples and has particular reference to improved apparatus used in drawing or otherwise collecting blood from veins. More particularly, the present invention relates to a blood sampling device in which the cannula is mounted such that it is firmly held in its mounting but is capable of being easily removed. The present invention also relates to such a device in which the cannula is automatically indexed and oriented.

Conventional practices in the collection of blood samples from live subjects include the use of an evacuated tube or vial closed at one end by a stopper of rubber or other resilient material adapted to be pierced by a cannula or hollow needle which is eitther directly or indirectly in communication with a vein of the patient. The stopper is generally formed with an inner axial recess extended partially from the lower end thereof and, in many cases, a similar recess extends downwardly from the top of the stopper. In either event, a diaphragm is thus formed in the stopper, the primary purpose of the diaphragm being to present a reduced thickness portion permitting ready insertion of the needle therethrough. A more recently developed stopper has a planar upper end and a recess extending upwardly from the bottom of the stopper.

In such prior art devices, the cannula is mounted in a holder in such a manner that the cannula may be caused to puncture the stopper by moving the holder. In such devices, the cannula may be mounted directly on the holder or may be mounted in a hub which, in turn, is mounted on the holder. In either case, the cannula is firmly attached to its mounting by well known means such as gluing, swedging, friction fitting, flaring, wedging or the like. Where a hub is used, the hub may be attached to the holder by a luer lock, friction fit or a threaded connection.

Although such devices have gained reasonable acceptance, they are subject to many deficiencies. Among these deficiencies are the impossibility or great difficulty in removing the cannula from its mounting, the great amount of care that must be taken in mounting the cannula such that sufficient length is present on each side of the mounting to both pierce the stopper and to pierce the vein of the subject, and the near impossibility of consistently orienting the cannula in its mounting such that the bevel in the end thereof which is to be inserted in the subject is in the proper position when the blood sampling assembly is held in the normal manner. Furthermore, none of the prior art devices permit removal of the cannula from the holder without touching the cannula or hub. This is a particularly serious disadvantage since many ailments, such as hepatitis, may be contracted simply by contact with the blood which remains on the cannula after it is withdrawn from the subject.

The present invention is not subject to these disadvantages and has many additional advantages.

It is an object of the present invention to provide a blood sampling assembly in which the cannula is firmly held in a holder, but which permits easy and rapid mounting and removal of the cannula without touching the cannula.

Another object of the present invention is to provide a blood sampling assembly in which the cannula is automatically indexed such that it presents sufficient length both for insertion into the subject and for puncturing of the stopper.

It is a further object of the present invention to provide a blood sampling assembly in which the bevel in the needle end which is to be inserted into the patient is automatically oriented with respect to the holder.

It is another object of this invention to provide a blood sampling assembly in which there is no necessity to provide the cannula with a hub.

Still another object of the present invention is to provide a blood sampling assembly in which a longitudinal portion of the cannula is substantially coplanar with a longitudinal wall of the holder.

Other objects and advantages of the present invention will be readily apparent from the following detailed description of preferred embodiments thereof when read in connection with the accompanying drawings.

Briefly, the present invention comprises a blood sampling assembly in which a cannula is firmly held in a mounting but is easily removable therefrom. A preferred embodiment of the present invention comprises a cannula which is other than straight and a mounting means having a configuration which generally corresponds to that of the cannula. In a preferred embodiment of the present invention, the cannula is held in its mounting by a slidable member. It is preferred that the slidable member engage the cannula in at least a portion of that part of the configuration of the cannula which renders it other than straight. In the preferred embodiment of the present invention, the cannula is so mounted in the holder and a stoppered blood collection vial is slidably mounted in the holder. The cannula of the present invention may have a variety of configurations which are other than straight. For example, the cannula may consist of two parallel portions connected by a diagonal intermediate portion, or the cannula may simply be provided with a U-bend in an intermediate portion thereof, or it may have virtually any other configuration which is other than straight. The preferred embodiment of the present invention comprises a cannula which has two portions located in different planes which are connected by a diagonal intermediate portion. This intermediate portion may be slightly bowed in order to provide a spring effect. The previously described "slidable member" may be mounted by means of a hinge or in other suitable manners such that it is movable.

Figures 1, 2, 6, 7, 8:
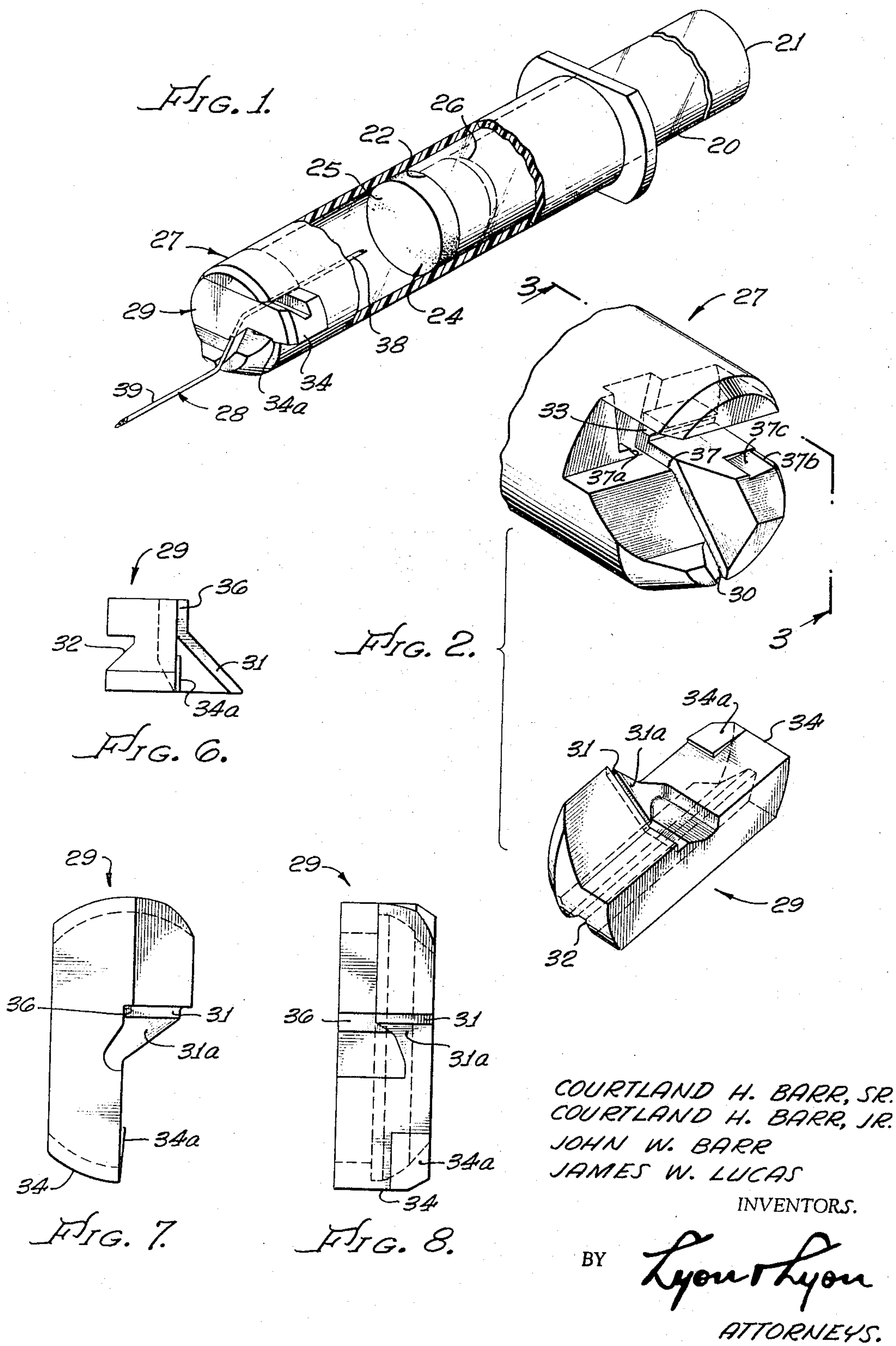
FIGURE 1 is a perspective view of a blood sampling assembly embodying the present invention.
FIGURE 2 is a detail illustration of an embodiment of the mounting means comprising the present invention in which the elements thereof are shown in exploded view.
FIGURES 6, 7 and 8 are end, top and side views, respectively, of the slide element illustrated in FIGURE 2.

Referring now to the drawings, one embodiment of the present invention is illustrated in FIGURES 1–9. The blood sampling assembly shown therein includes a tube or vial 20, preferably of glass, having a closed bottom end 21, the top of the open end 22 being closed by a stopper 24.

The stopper 24 is made of rubber or rubber-like material of suitable composition. In this embodiment, the stopper 24 is provided with flanged head portion 25 overlying the end of vial 20. Integral with the head portion is a body portion 26 which extends into the open end of the vial, the diameter of the body portion being somewhat larger than the inside diameter of the vial so that the body portion is under compression when inserted into the assembled position shown. The lower end of the body portion is beveled so as to facilitate assembly of the stopper and the vial.

Flange 25 is in frictional contact with the holder indicated generally by numeral 27. Mounted in the holder 27 is a cannula indicated generally by numeral 28.

The mounting means at the end of holder 27 are illustrated in detail in FIGURE 2. This mounting means essentially of holder 27 and the slide element which is indicated generally by numeral 29. In this embodiment, the cannula has the shape illustrated in FIGURE 9. Thus, the configuration of the mounting means corresponds generally to that of the cannula. Holder 27 is provided with groove 30 and slide element 29 is provided with groove 31. When these elements are assembled, grooves 30 and 31 will be adjacent to the intermediate portion 40 of cannula 28. Slide element 29 is also provided with groove 32 which is adapted to engage ridge 33 located on holder 27. Thus, in order to insert slide element 29 into holder 27, slide element 29 would be rotated 180° around its original axis from the position illustrated in FIGURE 2 and end 34 of slide element 29 would be inserted into holder 27. The mounting means may also be provided with protrusion **37*a* which serves to aid wall 37** in positioning the cannula.

Figure 3:
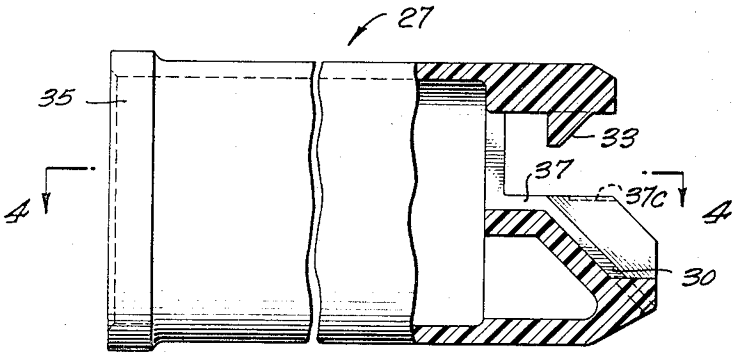
FIGURE 3 is a sectional view taken on line 3—3 of FIGURE 2.
Figure 4:
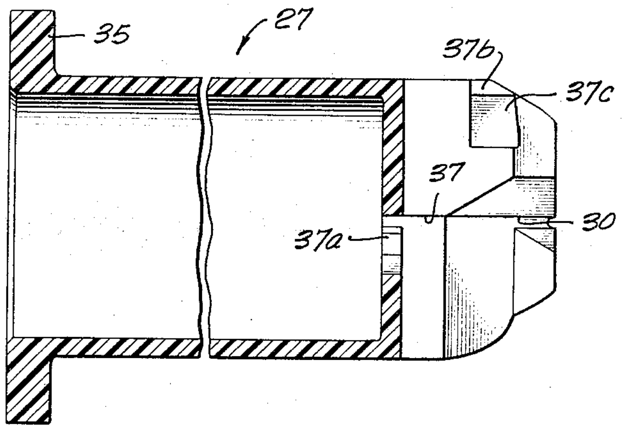
FIGURE 4 is a sectional view taken on line 4—4 of FIGURE 3.
Figures 5, 9:
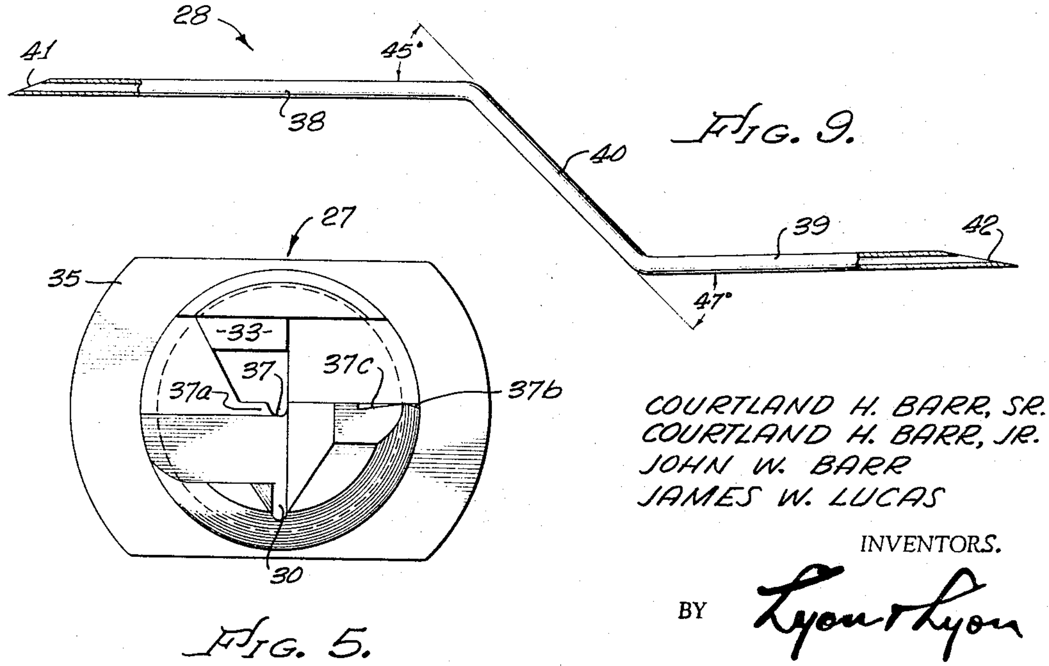
FIGURE 5 is an end view of the structure illustrated in FIGURE 3.
FIGURE 9 is a side view of the cannula adapted for use with the holder illustrated in FIGURE 2.

FIGURES 3–5 illustrate holder 27, without slide element 29, in partial section. These figures illustrate groove 30 and ridge 33 which have previously been described. Also shown are flanges 35 which serve as finger grips and horizontal wall 37. As clearly shown in FIGURE 5, indentation **37*b* is provided which cooperates with protrusion 34*a* (shown in FIGURES 6–8) to hold slide means 29 firmly when the apparatus is assembled. Indentation 37*c* is also provided to prevent slide means 29** from falling from the holder when the cannula is removed.

FIGURES 6–8 illustrate slide element 29. Grooves 31 and 32 have previously been described. Also shown is wall 36 which extends parallel to wall 37 in holder 27 when the slide element is inserted into the holder. Sloped wall **31*a* is provided to guide the cannula during mounting. Protrusion 34*a*** is also illustrated.

FIGURE 9 illustrates the cannula which is used with the structure illustrated in FIGURES 1–8. This cannula, which is indicated generally by numeral 28, comprises two substantially parallel portions 38 and 39 which are connected by diagonal intermediate portion 40. In the preferred embodiment of the present invention, intermediate portion 40 is slightly bowed and portion 38 meets portion 40 at an angle of 45° while portion 39 meets portion 40 at an angle of 47°. Preferably, portions 38, 39 and 40 are in the same vertical plane as illustrated in FIGURE 9. Preferably, each of the ends of cannula 28 are provided with bevels 41 and 42. In this preferred embodiment, bevel 41, which is designed to puncture the stopper has a bevel angle of approximately 23° while bevel 42 which is designed for insertion into the patient has a bevel angle of approximately 10°. Furthermore, bevel 42 is oriented with respect to diagonal portion 40 such that, when the cannula has been assembled in the holder, the bevel 42 will be presented at the proper angle to the vein of the subject when the assembly is held in the normal manner.

Furthermore, as clearly shown in FIGURE 1, when the device of this embodiment of the invention is assembled, portion 39 of cannula 28 is in substantially the same plane as the longitudinal wall of holder 27. This is an important advantage of the present invention because it facilitates insertion of the cannula into a vein since the preferred mode of insertion is to move the cannula in a direction which is almost parallel to the vein.

To assemble the structure illustrated in FIGURES 1–9, the cannula is simply placed in the holder such that intermediate portion 40 rests against groove 30. Slide element 29 is then inserted into holder 27 such that groove 31 is substantially parallel with and adjacent to intermediate portion 40. Wall 36 functions to firmly hold a part of portion 38 in groove 37. Furthermore, in this preferred embodiment, the slight bow in portion 40 is straightened by the pressure of groove 31 thereby exerting a spring loaded force which enhances the firm grip exerted on the cannula by the holder and slide element.

It will be obvious to those skilled in the art that a plurality of functions are performed by the assembly previously described. Not only is the cannula firmly gripped by the holder and slide element, but the cannula is also indexed such that precisely the right length extends inwardly into the holder and operates efficiently to puncture the stopper while precisely the correct length is presented for insertion into the patient. In addition, bevel 42 is automatically oriented with respect to flanges 35 and the longitudinal wall of holder 27 such that when the blood sampling assembly is gripped with the thumb on the end 21 of the vial with the first and second fingers on flanges 35, the bevel is in precisely the correct orientation for insertion into the patient.

Removal of the cannula is easily and quickly accomplished without the necessity of touching the cannula simply by exerting pressure on end 34 of slide element 29 which will cause slide element 29 to release its grip on cannula 28. If the assembly is held such that beveled end 42 of the cannula is pointed downwardly, gravitational force will cause the cannula to fall from the blood sampling assembly into any suitable receptacle. As previously noted, the fact that it is not necessary to touch the cannula to accomplish its removal is a great advantage since it prevents contraction of those ailments which could occur by reason of contact with the blood on the cannula.

Referring now to FIGURES 10–14, another embodiment of the present invention is shown. In this embodiment, the cannula 43 has a U-bend 44 in an intermediate portion thereof. End portions 45 and 46 may be parallel, but preferably are inclined at an angle such that they will exert a spring force as will hereinafter be explained. It is to be understood that bend 44 need only be generally U-shaped, i.e., this bend could be V-shaped or have perpendicular or angular corners.

Figure 10:
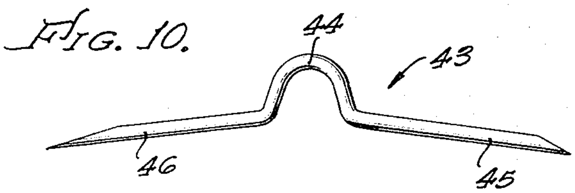
FIGURE 10 is a side view of an alternate type of cannula which may be used in the practice of the present invention.
Figure 11:
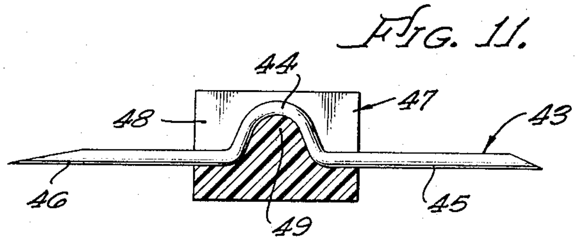
FIGURE 11 is a sectional view of the cannula of FIGURE 10 supported by a suitable mounting.
Figure 12:
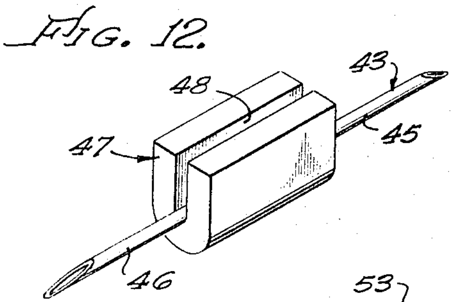
FIGURE 12 is a perspective view of the structure illustrated in FIGURE 11.

A suitable mounting for cannula 43 is illustrated in FIGURES 11 and 12. This mounting would, of course, be preferably integrally united with a holder such as holder 27 illustrated in FIGURE 1. This mounting which is indicated generally by numeral 47 is preferably a longitudinal member having a groove 48 therein. At an intermediate point along the length of groove 48, a protrusion 49 is formed. As illustrated in FIGURE 11, the U-shaped bend 44 in cannula 43 corresponds generally to protrusion 49. Preferably, protrusion 49 is formed such that it is slightly larger than U-shaped bend 44 when the bend is relaxed such that bend 44 will exert compressive forces on protrusion 49 when cannula 43 and mounting 47 are assembled. If, as illustrated in FIGURE 10, end portions 45 and 46 of cannula 43 are formed such that they are not parallel, they will exert a spring force which will enhance the grip of mounting 47 on cannula 43. It is apparent that protrusion 49 may extend upwardly or downwardly, as desired.

Figure 13:
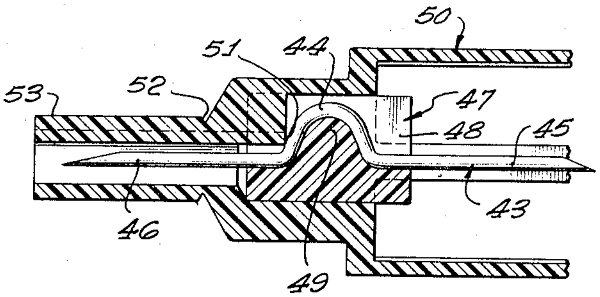
FIGURE 13 is a sectional view of an assembly comprising a cover member and the structure illustrated in FIGURE 11.
Figure 14:
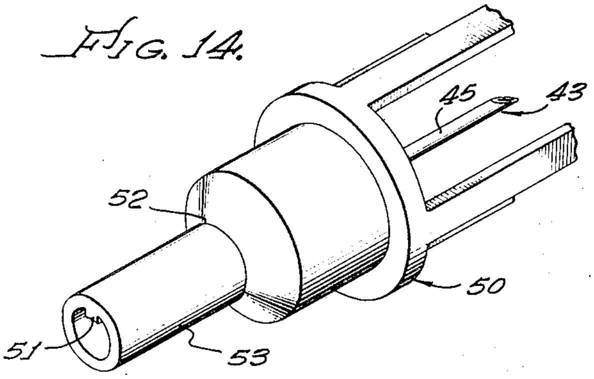
FIGURE 14 is a perspective view of the structure illustrated in FIGURE 13.
Figures 15, 16, 17, 18:
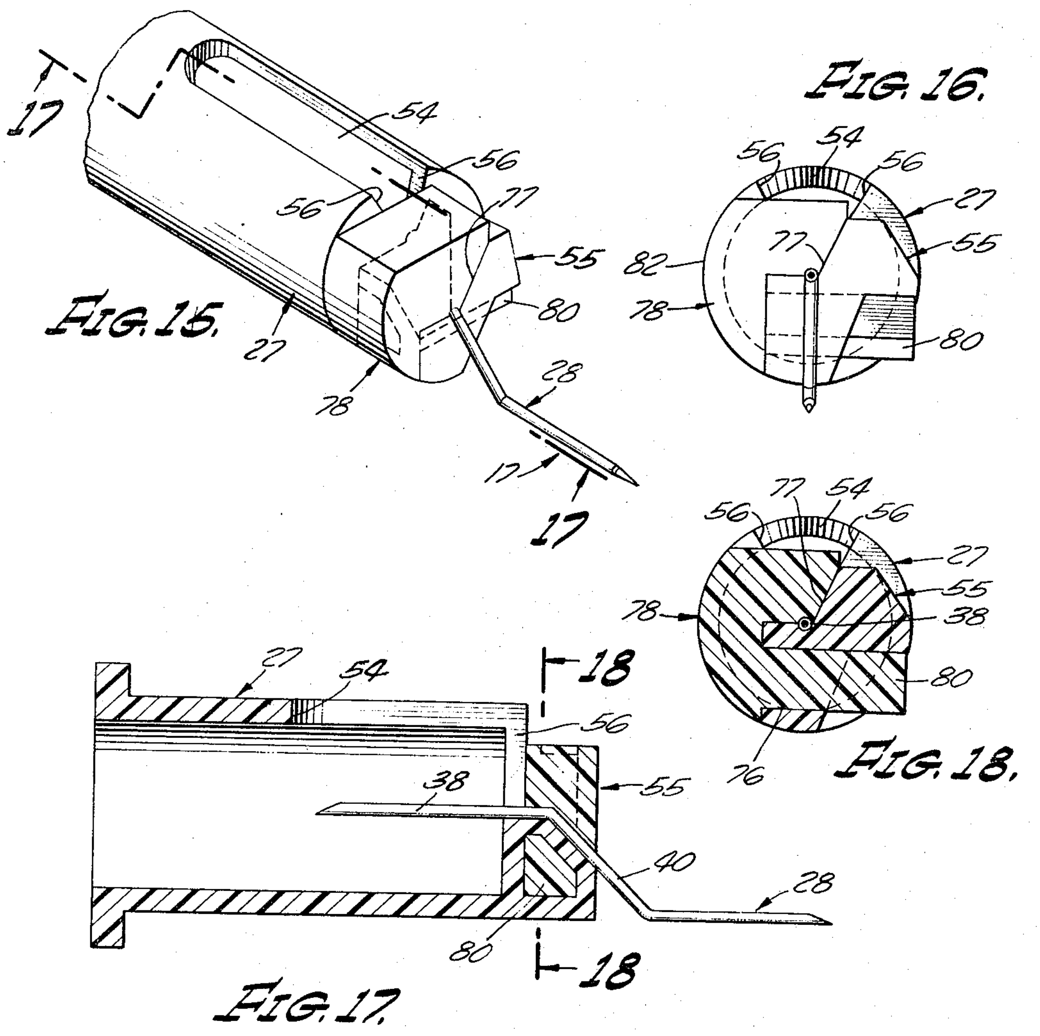
FIGURE 15 illustrates a modified form of the device illustrated in FIGURES 1–9.
FIGURE 16 is an end view of the device illustrated in FIGURE 15.
FIGURE 17 is a sectional view of the device of FIGURE 15 taken along the line 17—17.
FIGURE 18 is a sectional view of the device of FIGURE 15 taken along the line 18—18.

Referring now to FIGURES 13 and 14, a holder, indicated generally by numeral 50, is illustrated. This holder is shaped such that it will enclose mounting 47 and is preferably firmly attached thereto. Holder 50 is provided with key 51 which is adapted to slide through groove 48 in mounting 47 and come into abutting relation with bend 44 of cannula 43. Thus, when holder 50, mounting 47 and cannula 43 are assembled, cannula 43 is firmly held in the assembly. Holder 50 is formed such that it has a thin wall at the area indicated by numeral 52. Thus, when it is desired to use the blood sampling assembly of this embodiment, a cover 53 of holder 50 is given a rotational or pulling movement which will cause a rupture at the area 52 and expose cannula 43 for insertion into the subject.

It will be apparent to those skilled in the art that this structure has substantially the same advantages over the prior art as that which has previously been described. Once again, the cannula is automatically indexed and oriented.

It will also be obvious to those skilled in the art that the structure of the present invention may be modified in various ways without departure from the scope of this invention. For example, rather than using holder 50, a concentric rotatable member having the same configuration as mounting 47 could be formed such that it could be rotated to open and closed groove 48. Preferably, the structure would be formed such that the rotatable member would engage the intermediate portion of the cannula in the closed position.

Similarly, it is obvious that the cannula need not have the configuration specifically described herein. For example, the cannula could simply be crimped or pinched to form an enlarged portion or a constriction could be formed in the cannula to give it an hour glass shape or the cannula could comprise two telescoped members thereby forming a circumferential ridge in an intermediate portion thereof. Similarly, the specific slide and pivot locks described herein need not be used. However, it is believed that the specific embodiments described herein are themselves of an inventive nature.

FIGURES 15–18 illustrate a modification of the embodiment of the present invention which is shown in FIGURES 1–9. In this modified embodiment, holder 27 is provided with longitudinal opening 54 which is sufficiently long and wide to permit portion 38 of cannula 28 to pass therethrough. The end wall of holder 27 is provided with oblique surfaces 56. Thus, cannula 28 may be inserted directly from the top of holder 27 rather than being inserted through the end wall of holder 27. Holder 27 is also provided with the mounting means indicated generally by numeral 55. This mounting means is similar to that illustrated in FIGURES 1–8. In this embodiment the slide means indicated generally as 78, has a projection 80 which passes through aperture 76. As shown in FIGURES 15–18, slide means 78 has surfaces which generally engage the sloped wall 77 and the exterior of cannula 28. The changing of cannula 28 is accomplished by simply moving slide means 78 partially out of aperture 76 and away from sloped wall 77 while removing or inserting a cannula with the other hand, and then returning slide means 78 to the position shown in the drawings. This embodiment has, of course, all of the advantages described with respect to FIGURE 1. Furthermore, this embodiment is adapted for use with cannulas having various shapes, e.g., the shape shown in FIGURE 10. When the cannula of FIGURE 10 is used, the slide means is provided with a rod-like projection which engages the U-shaped bend in the cannula of FIGURE 10.

It is to be emphasized that the present invention is not limited to cannulas which are other than straight (although it is believed that cannulas which are other than straight are an inventive improvement over straight cannulas) and that blood sampling devices comprising a straight cannula which is firmly held in a holder but which is easily removable are within the scope of the present invention.

It will be apparent that there are many other modications of the specific embodiments disclosed herein which come within the scope of the present invention. Furthermore, various types of slide locks, threaded connections, etc., may be used in splace of the specific means described herein. For example, element 33 need not be located above slide member 29 as illustrated in FIGURES 1 and 2, but could be located below the slide member.

It will also be obvious to those skilled in the art that the structure of the present invention may be made from any suitable materials, e.g., plastic, metal, glass, etc., without adversely affecting the operation thereof. Also, it will be understood to those skilled in the art that while the improvements constituting the present invention have been described in connection with a blood sampling assembly, the use thereof is not inherently so limited and these improvements may be incorporated in other structures such as, for example, disposable assemblies for administering injectables. Furthermore, although the present invention is particularly useful in conjunction with evacuated or pressurized vials, it is not limited to use with such vials and may be used with syringe-type and other types of apparatus.

The embodiment of the present invention which is illustrated in FIGURES 15–19 is particularly useful for administering injectables. When so used, a vial (such as vial 20 of FIGURE 1) which is pressurized may be used or the vial may be provided with a plunger mechanism. In either case, one end of the needle is inserted into the vein in the manner previously described and the other end of the needle is caused to pierce the stopper in the vial. If the vial is pressurized, the injectable will automatically flow into the vein. If a plunger mechanism is provided in the vial, this is used in the conventional manner. When the injectable has entered the vein, the needle is withdrawn from the vein and the needle and vial (as well as the plunger if this is present) are caused to fall through opening 54 into a suitable receptacle. Thus, it is not necessary for the operator to come into contact with either the blood of the patient or the serum in the vial. This lack of contact is highly desirable for the reasons previously discussed.

Having fully described our invention, it is to be understood that we do not wish to be limited to the details set forth, but our invention is of the full scope of the appended claims.

We claim:

1. A cannula mount for releasably retaining in place a cannula having two end portions and an intermediate portion which makes an obtuse angle with each of the end portions comprising: a substantially tubular body having a first open end and a second open end which is partially closed by an end wall; said end wall being provided with an outwardly extending mounting means for slidably mounting a slide element; a slide element slidably mounted in said mounting means for sliding movement in a direction substantially transverse to the longitudinal axis of said body, said slide element and said mounting means being provided with walls for cooperating to releasably grip the intermediate portion of said cannula; said mounting means comprising a pair of outwardly extending arms, the first one of said arms having a first surface which is substantially perpendicular to said end wall and a second surface which is inclined with respect to said end wall; and said slide element being provided with the surfaces which substantially correspond to said first and second surfaces.

2. The cannula of claim 1 wherein one surface of said slide element is provided with a projection which cooperates with a first ridge and a second ridge formed on a corresponding surface of said mounting means to hold said slide element in gripping and open positions respectively.

3. The cannula mount of claim 1, wherein the second of one of said arms is provided with a guide means which extend transversely of the axis of said mount and said guide element is provided with a groove which corresponds to said slide means.

4. A blood sampling assembly comprising a cannula, a cannula mount and a vial, said vial being closed at one end by a stopper; said cannula mount having a substantially tubular body having a first open end and a second open end which is partially closed by an end wall; said stopper vial being mounted for slidable movement in said body whereby said stopper may be brought adjacent to said end wall; said end wall being provided with an outwardly extending mounting means for slidably mounting a slide element; and a slide element slidably mounted in said mounting means for sliding movement in a direction substantially transverse to the longitudinal axis of said body; said cannula having two end portions and an intermediate portion which makes an obtuse angle with each of said end portions, said slide element and said mounting means being provided with walls which cooperate to releasably grip the intermediate portion of said cannula whereby said cannula may be securely held in said cannula mount such that one end portion of said cannula extends into said body for a distance sufficient to enable it to pierce said stopper and communicate with the interior of said vial when said vial is urged toward said end wall.

5. The assembly of claim 4 wherein the end portions of said cannula have beveled tips and said bevels are held in a pre-determined relationship to said body by said cannula mount.

6. The assembly of claim 5 wherein the end portion of said cannula which extends outwardly from said mount is coplanar with the body of said mount.

7. The assembly of claim 5 wherein, when said slide element is in the open position, the slide element, end wall and mounting means form an opening which is sufficient to permit said cannula to fall freely from said cannula mount.

8. The assembly of claim 5 wherein said body is provided with a wall which defines an aperture, said aperture permitting passage of said cannula into and out of said body in a direction transverse to the axis of said body.

9. The assembly of claim 5 wherein the intermediate portion of said cannula is bowed.

10. A blood sampling assembly comprising a cannula, and a holder, said cannula comprising two end portions and an intermediate portion, said end portions being substantially straight and said intermediate portion being generally U-shaped, said holder being provided with a mounting means comprising a grooved member having a protrusion therein, said protrusion having a configuration substantially corresponding to that of the intermediate portion of the cannula, said cannula being received in said grooved member, said holder being substantially tubular and being provided with a key which extends into at least a portion of the interior of said tubular member and being slidably received in said grooved member to engage the intermediate portion of said cannula.

11. The assembly of claim 10 wherein said holder is formed such that the strength of the walls of the intermediate portion thereof is substantially less than the strength of the walls of the remainder of said holder.

12. A cannula mount adapted to releasably retain in place a cannula having two end portions and an intermediate portion which makes an obtuse angle with each of the end portions comprising: a substantially tubular body having an end wall portion, said tubular body being provided with a longitudinal opening which is sufficiently long and wide to permit a portion of said cannula to pass therethrough, said longitudinal opening terminating in a slot in said end wall to permit the passage of said cannula therethrough, a mounting means projecting from said end wall having surfaces substantially conforming to the transitional area of the cannula wherein the one end portion and the obtuse portion meet, said mounting means also having beneath said surfaces a slot for receiving a slide means, and a slide means having one portion received in said slot and another portion conforming generally to said surfaces of said mounting means whereby said cannula is adapted to be releasably received between said mounting means and said slide.

13. A blood sampling assembly comprising: a cannula, said cannula comprising two end portions and an intermediate obtuse portion, a holder comprising a substantially tubular body having an end wall portion, said tubular body being provided with a longitudinal opening which is sufficiently long and wide to permit a portion of said cannula to pass therethrough, said longitudinal opening terminating in a slot in said end wall to permit the passage of said cannula therethrough, a mounting means projecting from said end wall having surfaces substantially conforming to the transitional area of the cannula wherein the one end portion and the obtuse portion meet, said mounting means also having beneath said surfaces a slot for receiving a slide means, and a slide means having one portion received in said slot and another portion conforming generally to said surfaces of said mounting means whereby said cannula is releasably received between said mounting means and said slide.

References Cited

UNITED STATES PATENTS

| | | | |
|---|---|---|---|
| 1,006,895 | 10/1911 | Albree | 279—97 |
| 2,147,616 | 2/1939 | Chaput | 128—221 |
| 2,437,408 | 3/1948 | Soet | 128—276 |
| 2,665,688 | 1/1954 | Hyslop | 128—218 |
| 2,714,888 | 8/1955 | Williams | 128—215 |
| 2,855,927 | 10/1958 | Henderson | 128—218 |
| 2,875,760 | 3/1959 | Haber | 128—215 |
| 3,055,364 | 9/1962 | Myerson et al. | 128—221 |
| 3,099,988 | 8/1963 | Ginsburg | 128—221 |

FOREIGN PATENTS

| | | |
|---|---|---|
| 1,168,505 | 12/1958 | France. |
| 386,893 | 12/1923 | Germany. |
| 1,061,036 | 9/1959 | Germany. |

RICHARD A. GAUDET, *Primary Examiner.*

D. L. TRULUCK, *Examiner.*